United States Patent
Kim et al.

(10) Patent No.: US 7,396,136 B2
(45) Date of Patent: Jul. 8, 2008

(54) ILLUMINATION UNIT HAVING AN LED AND IMAGE PROJECTING APPARATUS EMPLOYING THE SAME

(75) Inventors: Su-gun Kim, Hwaseong-si (KR); Dan-sik Kim, Suwon-si (KR); Ki-boon Seong, Anyong-si (KR); Kye-boon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/233,076

(22) Filed: Sep. 23, 2005

(65) Prior Publication Data

US 2006/0072078 A1 Apr. 6, 2006

(30) Foreign Application Priority Data

Oct. 1, 2004 (KR) .................. 10-2004-0078270

(51) Int. Cl.
*G03B 21/20* (2006.01)
*G02F 1/13357* (2006.01)

(52) U.S. Cl. .................. 353/94; 349/62; 348/801; 362/555

(58) Field of Classification Search .......... 348/742, 348/743, 798–804; 349/5, 7, 8, 9, 57, 61, 349/69, 62; 359/5, 7, 8, 9, 641, 642, 838; 362/294, 555, 559, 560, 800, 561; 385/133, 385/901, 33–35, 1–4; 353/31, 30, 20, 94, 353/97–99, 102, 122, 60, 61, 34, 37
See application file for complete search history.

(56) References Cited

U.S. PATENT DOCUMENTS

| 4,394,679 | A | | 7/1983 | Hawrylo |
| 5,833,341 | A | * | 11/1998 | Kimura et al. ............ 353/98 |
| 6,191,872 | B1 | * | 2/2001 | DeCaro et al. ........... 358/509 |
| 6,215,598 | B1 | | 4/2001 | Hwu |
| 6,224,216 | B1 | * | 5/2001 | Parker et al. ............ 353/31 |
| 6,517,218 | B2 | | 2/2003 | Hochstein |
| 6,547,423 | B2 | * | 4/2003 | Marshall et al. ......... 362/333 |
| 6,712,486 | B1 | * | 3/2004 | Popovich et al. ......... 362/249 |
| 6,715,901 | B2 | | 4/2004 | Huang |
| 6,834,963 | B2 | * | 12/2004 | Kim et al. .............. 353/31 |

(Continued)

FOREIGN PATENT DOCUMENTS

CN 85203031 5/1986

(Continued)

OTHER PUBLICATIONS

Korean Office Action dated Mar. 8, 2006 of Korean Patent Application No. 10-2004-0078270.

(Continued)

*Primary Examiner*—Andrew T Sever
(74) *Attorney, Agent, or Firm*—Stanzione & Kim, LLP

(57) ABSTRACT

An illumination unit includes a first heat conducting plate and a plurality of light source modules to emit a plurality of lights having different colors, each light source module having at least one LED mounted on the first heat conducting plate and at least one corresponding collimator to collimate the lights emitted from the at least one LED.

16 Claims, 8 Drawing Sheets

U.S. PATENT DOCUMENTS

| | | | |
|---|---|---|---|
| 6,871,982 B2 * | 3/2005 | Holman et al. | 362/331 |
| 6,969,180 B2 * | 11/2005 | Waters | 362/293 |
| 7,040,767 B2 * | 5/2006 | Lee et al. | 353/99 |
| 7,059,731 B2 * | 6/2006 | Lee et al. | 353/99 |
| 7,059,746 B2 * | 6/2006 | Takezawa | 362/252 |
| 7,088,321 B1 * | 8/2006 | Parker | 345/83 |
| 7,090,386 B2 * | 8/2006 | Coushaine et al. | 362/555 |
| 7,128,422 B2 * | 10/2006 | Shiraishi et al. | 353/57 |
| 7,182,497 B2 * | 2/2007 | Lee et al. | 362/555 |
| 2002/0114157 A1 * | 8/2002 | Chuang et al. | 362/231 |
| 2003/0133080 A1 | 7/2003 | Ogawa et al. | |
| 2004/0062044 A1 * | 4/2004 | Hanano | 362/317 |
| 2004/0090794 A1 * | 5/2004 | Ollett et al. | 362/555 |
| 2005/0018147 A1 * | 1/2005 | Lee et al. | 353/98 |
| 2005/0190562 A1 * | 9/2005 | Keuper et al. | 362/325 |
| 2005/0254019 A1 * | 11/2005 | Magarill et al. | 353/97 |
| 2005/0259198 A1 * | 11/2005 | Lubart et al. | 349/113 |
| 2005/0259424 A1 * | 11/2005 | Zampini et al. | 362/294 |
| 2005/0270775 A1 * | 12/2005 | Harbers et al. | 362/231 |
| 2006/0203486 A1 * | 9/2006 | Lee et al. | 362/244 |
| 2006/0221310 A1 * | 10/2006 | Kim et al. | 353/99 |
| 2006/0238720 A1 * | 10/2006 | Lee et al. | 353/38 |
| 2007/0058389 A1 * | 3/2007 | Brukilacchio | 362/555 |

FOREIGN PATENT DOCUMENTS

| | | |
|---|---|---|
| EP | 271956 | 6/1988 |
| EP | 0271956 | 6/1988 |
| EP | 1439412 | 7/2004 |
| JP | 11-64849 | 3/1999 |
| JP | 2000-180962 | 6/2000 |
| JP | 2004-53949 | 2/2004 |
| JP | 2004-37523 | 5/2004 |
| KR | 2002-89785 A | 11/2002 |
| KR | 20-327640 | 9/2003 |
| KR | 2003-79777 | 10/2003 |
| KR | 20-344157 | 2/2004 |

OTHER PUBLICATIONS

European Search Report dated Feb. 24, 2006 issued in EP 05107709.7.

Chinese Office Action dated Dec. 29, 2006 issued in CN 2005-100899121.

* cited by examiner

ILLUMINATION UNIT HAVING AN LED AND IMAGE PROJECTING APPARATUS EMPLOYING THE SAME

CROSS-REFERENCE TO RELATED APPLICATIONS

This application claims priority from Korean Patent Application No. 2004-78270, filed on Oct. 1, 2004, in the Korean Intellectual Property Office, the disclosure of which is incorporated herein in its entirety by reference.

BACKGROUND OF THE INVENTION

1. Field of the Invention

The present general inventive concept relates to an illumination unit having an LED and an image projecting apparatus employing the same.

2. Description of the Related Art

In general, an image projecting apparatus includes an illumination unit to illuminate an optical modulation element. A metal halide lamp or a super high-pressure mercury lamp are typically used as a light source of the illumination unit. Since the metal halide lamp and the super high-pressure mercury lamp are very large, the illumination unit is also large. Additionally, since the life span of these light sources are several thousands of hours at best, the light sources need to be replaced frequently. In an effort to solve these problems, an LED having a relatively longer life span has been used as the light source. For example, U.S. Patent Publication Application No. 2003-0133080 entitled "LED-Illumination-Type DMD Projector and Optical System Thereof" discloses an image projection apparatus using an LED.

However, heat is typically generated when the LED is operated, and an optical efficiency of the LED depends on a temperature thereof. FIG. 1 is a graph illustrating changes in relative optical power of the LED according to changes in temperature. Referring to FIG. 1, when the relative optical power corresponding with 45° C. is assumed to be 100%, the relative optical power increases as the temperature decreases. Similarly, the relative optical power decreases as the temperature increases. Thus, a heat radiating structure which can effectively dissipate heat generated by the LED is required. Korean Patent Publication Application No. 2004-37523 discloses a heat radiating structure including a heat radiating fin that is disposed around the LED in a circular manner.

The amount of light generated by the LED is smaller than that generated by the metal halide lamp or super high-pressure mercury lamp. Thus, in order to obtain an appropriate amount of light, an LED array is used. In particular, an illumination unit of the image projecting apparatus includes a plurality of LEDs emitting lights having different colors. In this case, since more than one heat radiating structure disclosed by Korean Patent Publication Application No. 2004-37523 is applied to each of the LEDs, the size of the illumination unit increases.

SUMMARY OF THE INVENTION

The present general inventive concept provides an illumination unit capable of effectively dissipating heat generated during operation of an LED, and an image projecting apparatus employing the same.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept can be achieved by providing an illumination unit comprising a first heat conducting plate and a plurality of light source modules to emit a plurality of lights having different colors, each light source module having at least one LED mounted on the first heat conducting plate and at least one corresponding collimator to collimate the lights emitted from the at least one LED.

The foregoing and/or other aspects and advantages of the present general inventive concept can also be achieved by providing an image projecting apparatus comprising an illumination unit to sequentially emit a plurality of lights having different colors, an optical modulation element to sequentially modulate the plurality of lights emitted from the illumination unit according to image information, and a projection lens unit to project the modulated light to a screen. The illumination unit comprises a first heat conducting plate and a plurality of light source modules to emit the plurality of lights having the different colors, each light source module having at least one LED mounted on the first heat conducting plate and at least one corresponding collimator to collimate the light emitted from the at least one LED.

The collimator may comprise a light incident surface through which to receive light from the at least one corresponding LED, a parabolic reflection surface facing the light incident surface and meeting the light incident surface at one end thereof to reflect the received light in substantially one direction, and a light exit surface arranged opposite to where the parabolic reflection surface meets the light incident surface, and the at least one corresponding LED is disposed at a focal point of the parabolic reflection surface.

Each of the plurality of light source modules may comprise a plurality of collimator groups in which one or more collimators are linearly arranged and a plurality of corresponding LED groups in which one or more LEDs are linearly arranged, the LED groups are arranged in a stepwise manner with respect to one another, and a plurality of mounting portions arranged in a stepwise manner to correspond with the LED groups are provided on the first heat conducting plate such that the LEDs of the corresponding LED groups are mounted thereon.

The illumination unit may further comprise a second heat conducting plate, and each light source module comprises a plurality of collimator groups in which one or more collimators are linearly arranged and a plurality of corresponding LED groups in which one or more LEDs are linearly arranged, and the LEDs of one or more first LED groups are mounted on the first heat conducting plate while the LEDs of one or more second LED groups are mounted on the second heat conducting plate.

The respective LED groups of the one or more first LED groups and the one or more second LED groups may be arranged in a stepwise manner with respect to one another. The illumination unit may further comprise first and second mounting portions provided on the first and second heat conducting plates, respectively, in a stepwise manner with respect to one another to correspond with the respective first one or more LED groups and the second one or more LED groups.

The foregoing and/or other aspects and advantages of the present general inventive concept can also be achieved by providing an illumination unit comprising a housing including one or more heat conducting plates and a plurality of light source modules disposed in the housing to emit lights having different colors. Each light source module may comprise at least one collimator including a parabolic reflection surface, a light incident surface facing the parabolic reflection surface, and a light exit surface arranged to cross the parabolic reflection surface and the light incident surface. Each light source unit may further comprise at least one corresponding LED to emit light to the light incident surface of the at least one collimator, wherein the at least one corresponding LED of the light source modules are mounted on the heat conducting plates for cooling.

The foregoing and/or other aspects and advantages of the present general inventive concept can also be achieved by providing an image projecting apparatus comprising an illumination unit to sequentially emit a plurality of lights having different colors, an optical modulation element to sequentially modulate the plurality of lights emitted by the illumination unit according to image information, and a projection lens unit to project the modulated light to a screen. The illumination unit may comprise a housing including one or more heat conducting plates and a plurality of light source modules disposed in the housing to emit the plurality of lights having the different colors. Each light source module may comprise at least one collimator including a parabolic reflection surface, a light incident surface facing the parabolic reflection surface, and a light exit surface arranged to cross the parabolic reflection surface and the light incident surface, and at least one corresponding LED mounted on the heat conducting plates for cooling.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
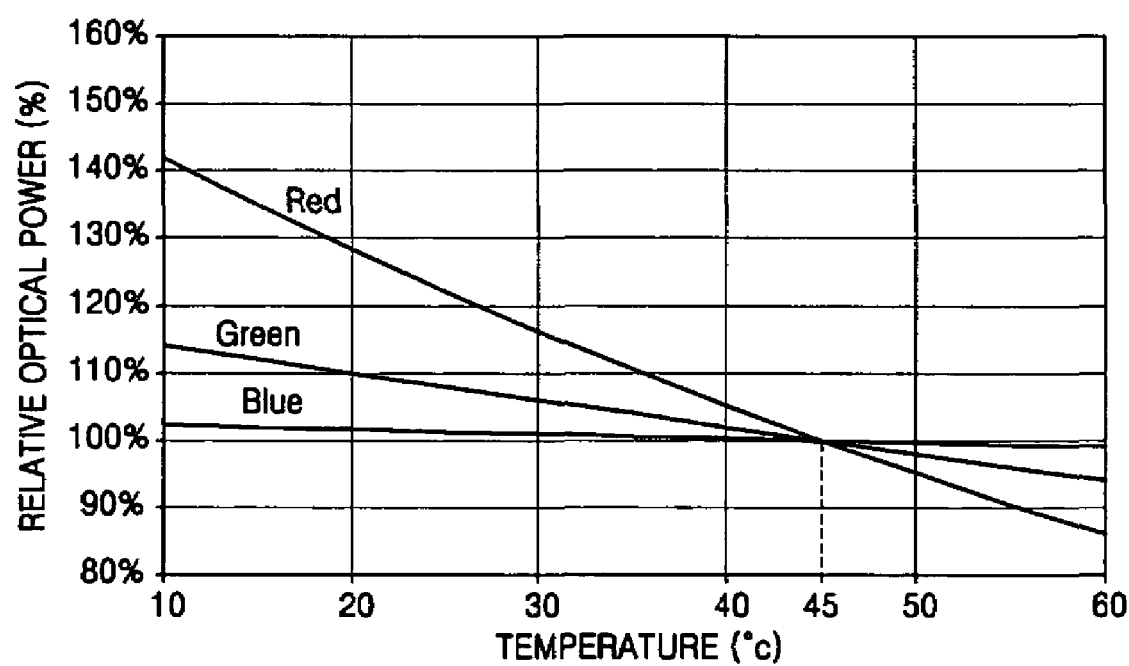
FIG. 1 is a graph illustrating a relationship between a temperature and a relative optical power of an LED.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
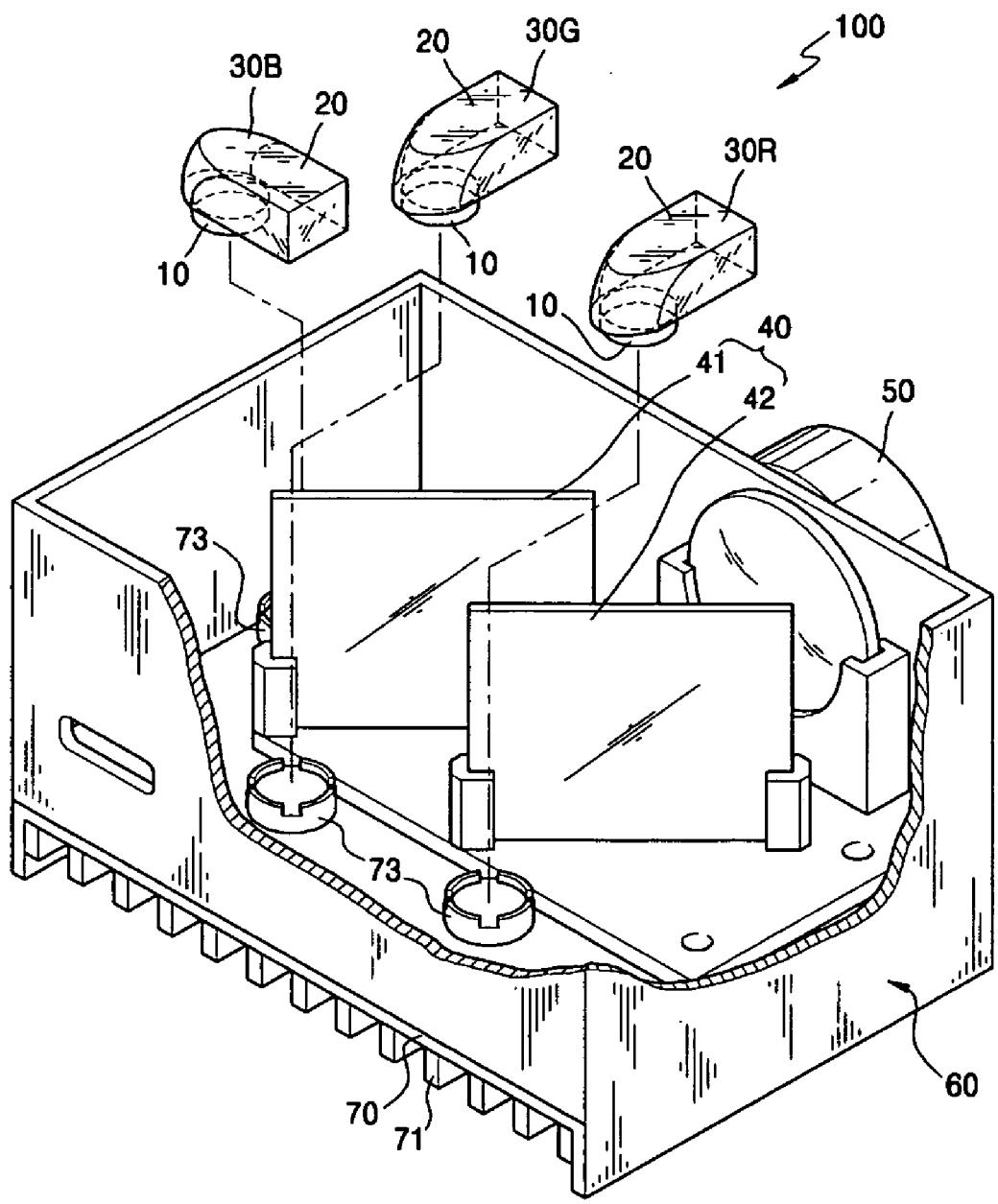
FIG. 2 is an exploded perspective view illustrating an illumination unit according to an embodiment of the present general inventive concept.
Figure 3:
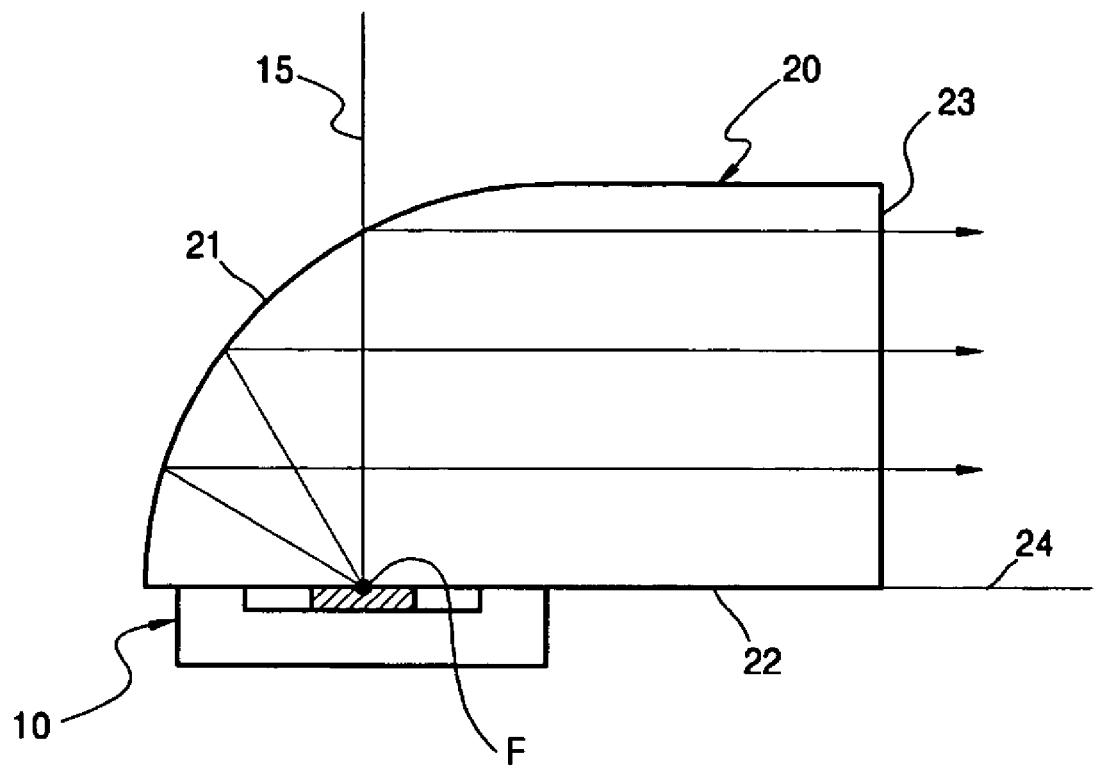
FIG. 3 is a cross sectional view illustrating a light source module of the illumination unit of FIG. 2.

Referring to FIG. 2, an illumination unit 100 according to an embodiment of the present general inventive concept includes light source modules 30R, 30G, and 30B to emit red (R), green (G), and blue (B) lights, respectively, and a first heat conducting plate 70 on which the light source modules 30R, 30G, and 30B are mounted. Each of the light source modules 30R, 30G, and 30B includes an LED 10 and a collimator 20 to collimate light emitted by the LED 10. FIG. 3 is a cross sectional view illustrating the light source module 30R, 30G, or 30B of the illumination unit 100 of FIG. 2. The collimator 20, as illustrated in FIG. 3, includes a parabolic reflection surface 21, a light incident surface 22 facing the parabolic reflection surface 21, and a light exit surface 23 arranged to cross the parabolic reflection surface 21 and the light incident surface 22.

The parabolic reflection surface 21 may have a variety of conic coefficients K other than −1. The parabolic reflection surface 21 refers to an aspheric surface having the conic coefficient K between −0.4 through −2.5. In particular, the conic coefficient K of the parabolic reflection surface 21 may be between −0.7 through −1.6. The conic coefficient K of the parabolic reflection surface 21 can be properly selected within the above range such that the collimator 20 collimates the light emitted from the LED 10 in a range of a radiation angle to effectively illuminate an object. The parabolic reflection surface 21 may have the conic efficient K of −1.

The light incident surface 22 may be a surface including a principal axis 24 of the parabolic reflection surface 21, may be parallel to a plane that includes the principal axis 24, or may be inclined at a predetermined angle with respect to the plane that includes the principal axis 24. The collimator 20 is a transparent body comprising, for example, glass having one end with a parabolic surface. The parabolic reflection surface 21 may be formed by coating a reflective material on an outer surface of the end of the transparent body having the parabolic surface.

Figure 4:
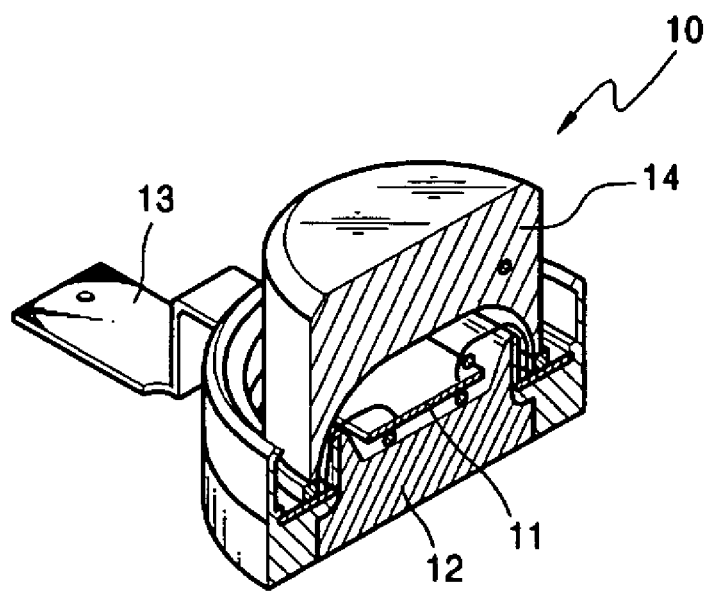
FIG. 4 is a partially cut-away perspective view illustrating an LED according to an embodiment of the present general inventive concept.

FIG. 4 is a partially cut-away perspective view illustrating an LED 10 according to an embodiment of the present general inventive concept. As illustrated in FIG. 4, the LED 10 includes an LED chip 11 to emit light, a heat conducting body 12 to dissipate heat generated by the LED chip 11, and an electrode 13 to provide a current to the LED chip 11. The LED 10 may further include a dome lens or cap 14 to cover the LED chip 11. Since the configuration of the LED 10 should be known to those skilled in the art, a detailed description thereof will not be provided.

Referring to FIGS. 3 and 4, the LED 10 is disposed at a focal point F of the parabolic reflection surface 21. In other words, the LED 10 is installed such that the LED chip 11 is disposed at the focal point F of the parabolic reflection surface 21. The collimator 20 can further include a concave portion (not shown) formed in the light incident surface 22 to provide a space to accommodate the dome lens 14. The LED 10 may be combined to the light incident surface 22. Since the LED chip 11 is a surface light source (i.e., not a point light source) it cannot be disposed exactly at the focal point F of the parabolic reflection surface 21. Thus, the LED 10 is disposed at around the focal point F of the parabolic reflection surface 21. Although the LED 10 of FIG. 3 is arranged such that an optical axis 15 thereof is substantially perpendicular to the principal axis 24 of the parabolic reflection surface 21, other arrangements that achieve the intended purpose of the embodiment may alternatively be used.

Referring to FIG. 3, the light emitted from the LED chip 11 passes through the light incident surface 22 into the collimator 20. The light is then reflected by the parabolic reflection surface 21 and collimated into beams that are substantially parallel to the principal axis 24 of the collimator 20. The collimated parallel beam then exits the collimator 20 through the light exit surface 23. The collimated beams can be made substantially parallel to each other, because the LED chip 11 is a surface light source. In other words, the light is not collimated to be a perfectly parallel beam, because the light beams are not all emitted from the focal point F and are instead emitted from different positions along the surface light source.

Heat is generated when the LED 10 is operated. As illustrated in FIG. 1, optical efficiency of the LED 10 depends on temperature. Thus, a heat conducting structure may be used to effectively dissipate the heat generated by the LED 10 away from the LED 10. The illumination unit is characterized in that the LED 10 is directly mounted on the first heat conducting plate 70 such that the heat generated by the LED 10 can be effectively dissipated from the LED 10 via the first conducting plate 70.

Referring back to FIG. 2, the LED 10 of each of the light source modules 30R, 30G, and 30B is mounted on the first heat conducting plate 70. A mounting portion 73 on which the LED 10 is mounted can be provided on the first heat conducting plate 70. The heat conducting body 12 of the LED 10 (see FIG. 4) contacts the first heat conducting plate 70 directly or through the mounting portion 73. The first heat conducting plate 70 may be manufactured of metal, such as aluminum, and may have a plurality of heat conducting fins 71 as illustrated in FIG. 2. Although not illustrated in the drawings, the first heat conducting plate 70 can be an evaporating portion of a heat pipe. The heat generated during the operation of the LED 10 is transferred to the first heat conducting plate 70 via the heat radiating body 12 of the LED 10. Accordingly, an illumination unit having a simple heat conducting structure which can effectively cool the LEDs 10 of the light source modules 30R, 30G, and 30B can be realized.

Figure 5:
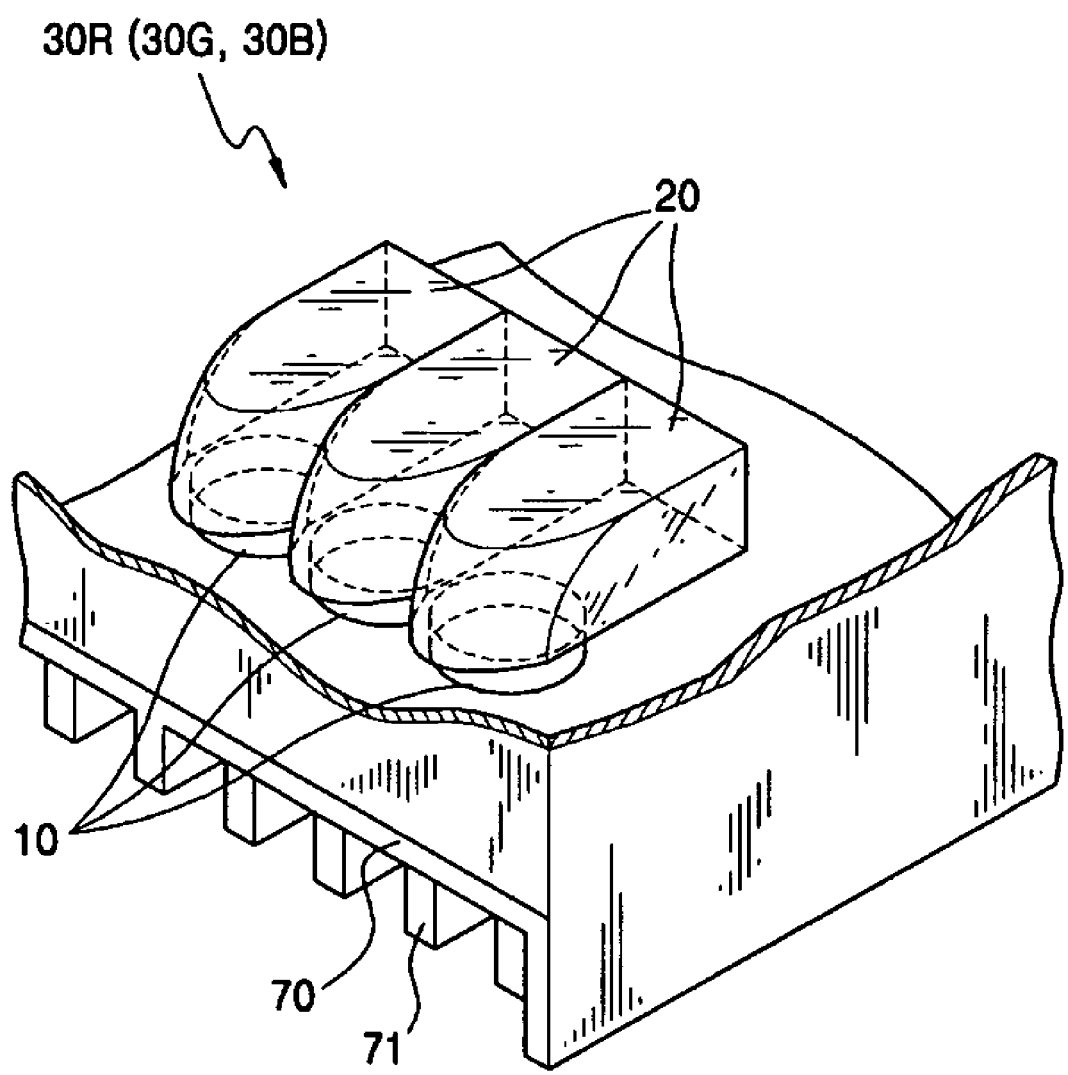
FIG. 5 is a perspective view illustrating a light source module having LEDs and collimators arranged in one dimension according to an embodiment of the present general inventive concept.

An amount of light produced by the LED 10 is generally less than that of a metal halide lamp or a super high-pressure mercury lamp. Thus, each of the light source modules 30R, 30G, and 30B can include a plurality of the LEDs 10 and the collimators 20. In this case, since the light is collimated using the parabolic reflection surface 21 instead of a lens, the light can be collimated at a higher efficiency than when the lens is used. FIG. 5 illustrates a light source module having LEDs and collimators arranged in one dimension according to an embodiment of the present general inventive concept. Referring to FIG. 5, a plurality of the LEDs 10 and a plurality of the collimators 20 can be arranged in one dimension. The LEDs 10 are mounted on the first heat conducting plate 70.

Figure 6:
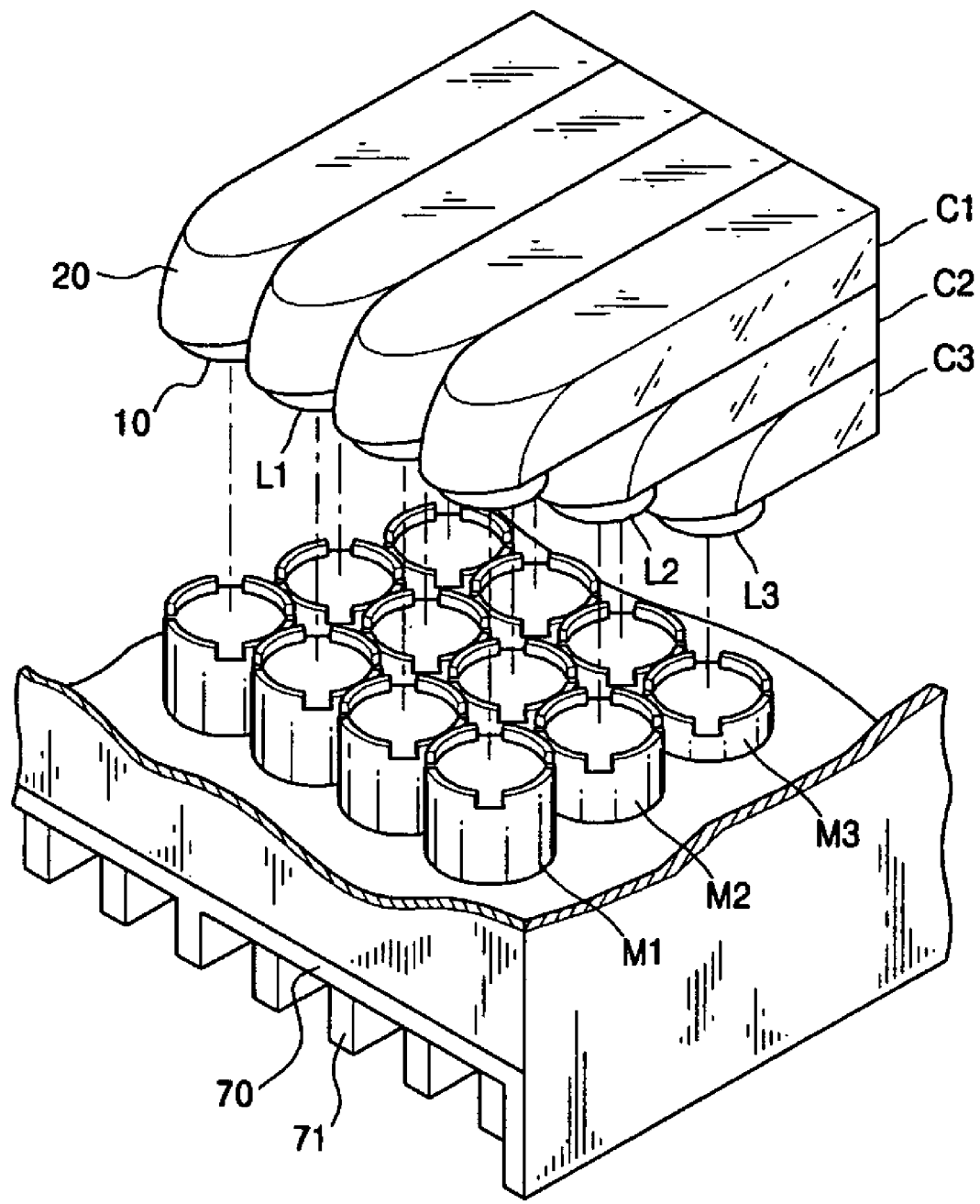
FIG. 6 is a perspective view illustrating a light source module having LEDs and collimators arranged in two dimensions according to another embodiment of the present general inventive concept.

Alternatively, the LEDs 10 and the collimators 20 can be arranged in two dimensions. FIG. 6 illustrates a light source module having the LEDs and the collimators arranged in two dimensions according to another embodiment of the present general inventive concept. Referring to FIG. 6, each of three collimator groups C1, C2, and C3 has four collimators 20 which are linearly arranged and each of three LED groups L1, L2, and L3 has four LEDs 10 which are also linearly arranged. The LED groups L1, L2, and L3 are arranged in a stepwise manner with respect to one another. Three mounting portions M1, M2, and M3 on which the LEDs 10 of the LED groups L1, L2, and L3 are mounted are provided on the first heat conducting plate 70. The three mounting portions M1, M2, and M3 are also arranged in a stepwise manner to correspond with the three LED groups L1, L2, and L3. Accordingly, the heat generated by the LEDs 10 in the LED groups L1, L2, and L3 can be effectively dissipated to the first heat conducting plate 70.

Referring back to FIG. 2, the illumination unit 100 can further include a housing 60 to accommodate the light source modules 30R, 30G, and 30B. The first heat conducting plate 70 forms part of the housing 60. For example, the first heat conducting plate 70 can form a lower plate of the housing 60. The illumination unit further includes a color synthesizing member 40 to guide the light emitted from the light source modules 30R, 30G, and 30B to proceed along a single optical path and a condensing lens unit 50 to condense the light onto an object to be illuminated. The color synthesizing member 40 may include first and second dichroic filters 41 and 42 arranged parallel to each other. The first dichroic filter 41 reflects a green light while the second dichroic filter 42 reflects a blue light and a green light. A red light emitted from the light source module 30R is transmitted through the second dichroic filter 42 and is incident on the condensing lens unit 50. The green light emitted from the light source module 30G is reflected by the first and second dichroic filters 41 and 42 and is incident on the condensing lens unit 50. The blue light emitted from the light source module 30B is transmitted through the first dichroic filter 41, is reflected by the second dichroic filer 42, and is incident on the condensing lens unit 50. Thus, the plurality of lights emitted from the light source modules 30R, 30G, and 30B are guided to the condensing lens 50 by the color synthesizing member 40. The color synthesizing member 40 and the condensing lens unit 50 are mounted on the first heat conducting plate 70 and are accommodated in the housing 60. Accordingly, a modularized illumination unit can be realized.

Figure 7:
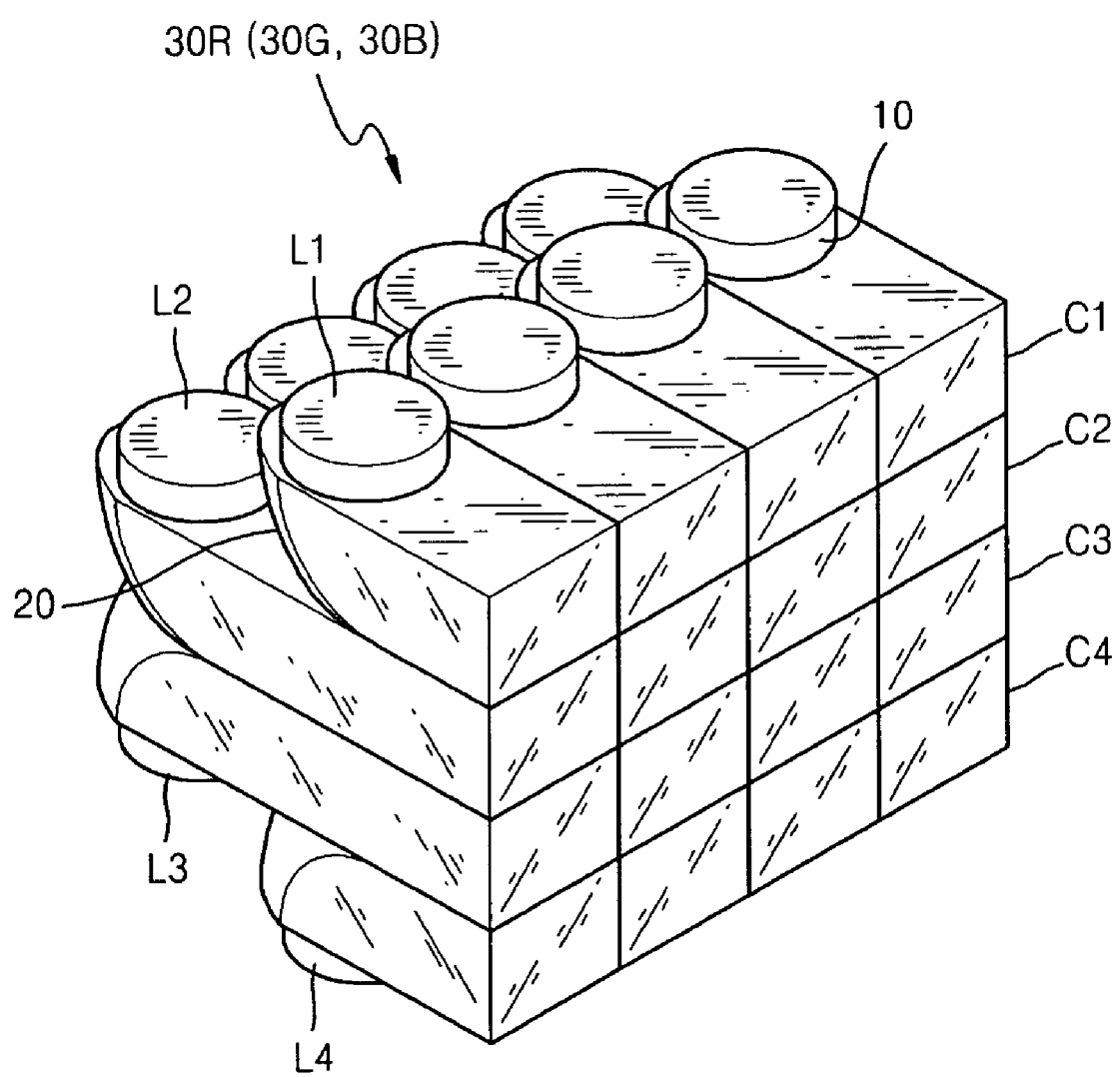
FIG. 7 is a perspective view illustrating a light source module having LEDs and collimators arranged in two dimensions according to another embodiment of the present general inventive concept.

FIG. 7 illustrates a light source module having LEDs and collimators arranged in two dimensions according to another embodiment of the present general inventive concept. As illustrated in FIG. 7, the LEDs 10 and the collimators 20 can be arranged in two dimensions. Referring to FIG. 7, each of collimator groups C1, C2, C3, and C4 has four collimators 20 which are arranged linearly and each of LED groups L1, L2, L3, and L4 has four LEDs 10 which are also arranged linearly. The collimator groups C1 and C2 and the LED groups L1 and L2 are arranged such that the LEDs 10 in those groups face upward while the collimator groups C3 and C4 and the LED groups L3 and L4 are arranged such that the LEDs 10 in those groups face downward. The LED groups L1 and L2 are arranged in an upward stepwise manner with respect to each other while the LED groups L3 and L4 are arranged in a downward stepwise manner with respect to each other.

Figure 8:
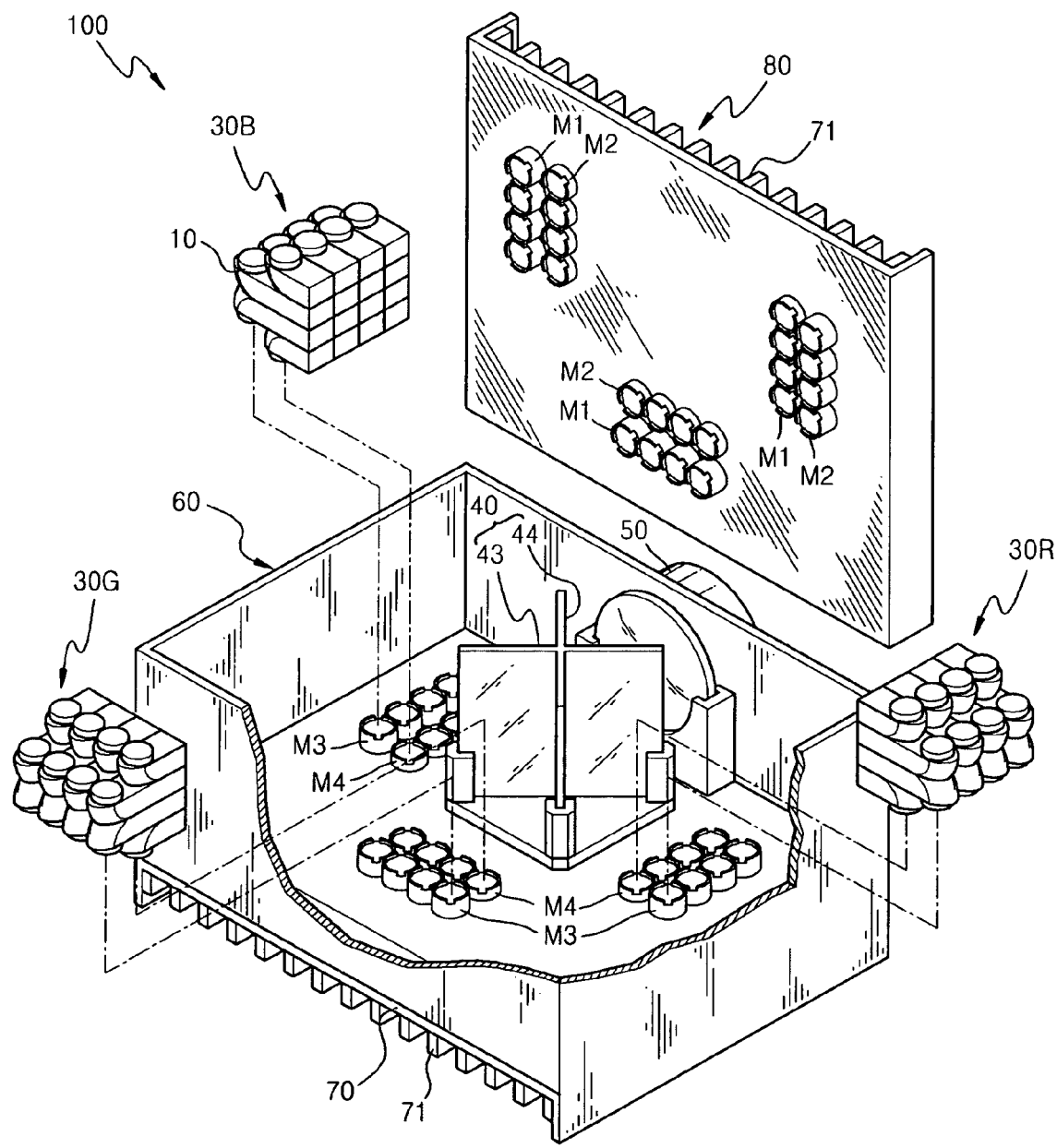
FIG. 8 is an exploded perspective view illustrating an illumination unit according to another embodiment of the present general inventive concept.

FIG. 8 illustrates an illumination unit 100 according to another embodiment of the present general inventive concept. In order to cool the LEDs 10 of the light source modules 30R, 30G, and 30B having the arrangement illustrated in FIG. 7, the illumination unit 100 100 of FIG. 8 is provided with the first heat conducting plate 70 and a second heat conducting plate 80 opposite to the first heat conducting plate 70. The first and second heat conducting plates 70 and 80 may be upper and lower plates of the housing 60, respectively. Mounting portions M3 and M4 are arranged on the first heat conducting plate 70 in a stepwise manner to correspond with the LED groups L3 and L4 such that the LEDs 10 of the LED groups L3 and L4 can be mounted thereon. Mounting portions M1 and M2 are arranged opposite to the mounting portions M3 and M4 on the second heat conducting plate 80 in a stepwise manner to correspond with the LED groups L1 and L2 such that the LEDs 10 of the LED groups L1 and L2 can be mounted thereon. Accordingly, the heat generated during the operation of the LEDs 10 in the LED groups L1, L2, L3, and L4 is dissipated through the first and second heat conducting plates 70 and 80.

The color synthesizing member 40 includes third and fourth dichroic filters 43 and 44 disposed in a crossing arrangement. The third dichroic filter 43 reflects a blue light while the fourth dichroic filter 44 reflects a red light. A green light is transmitted through the third and fourth dichroic filters 43 and 44. Thus, the plurality of lights emitted from the light source modules 30R, 30G, and 30B are guided to the condensing lens unit 50 by the color synthesizing member 40. The color synthesizing member 40 and the condensing lens unit 50 are mounted on the first heat conducting plate 70 and are accommodated in the housing 60. Accordingly, a modularized illumination unit can be realized.

Figure 9:
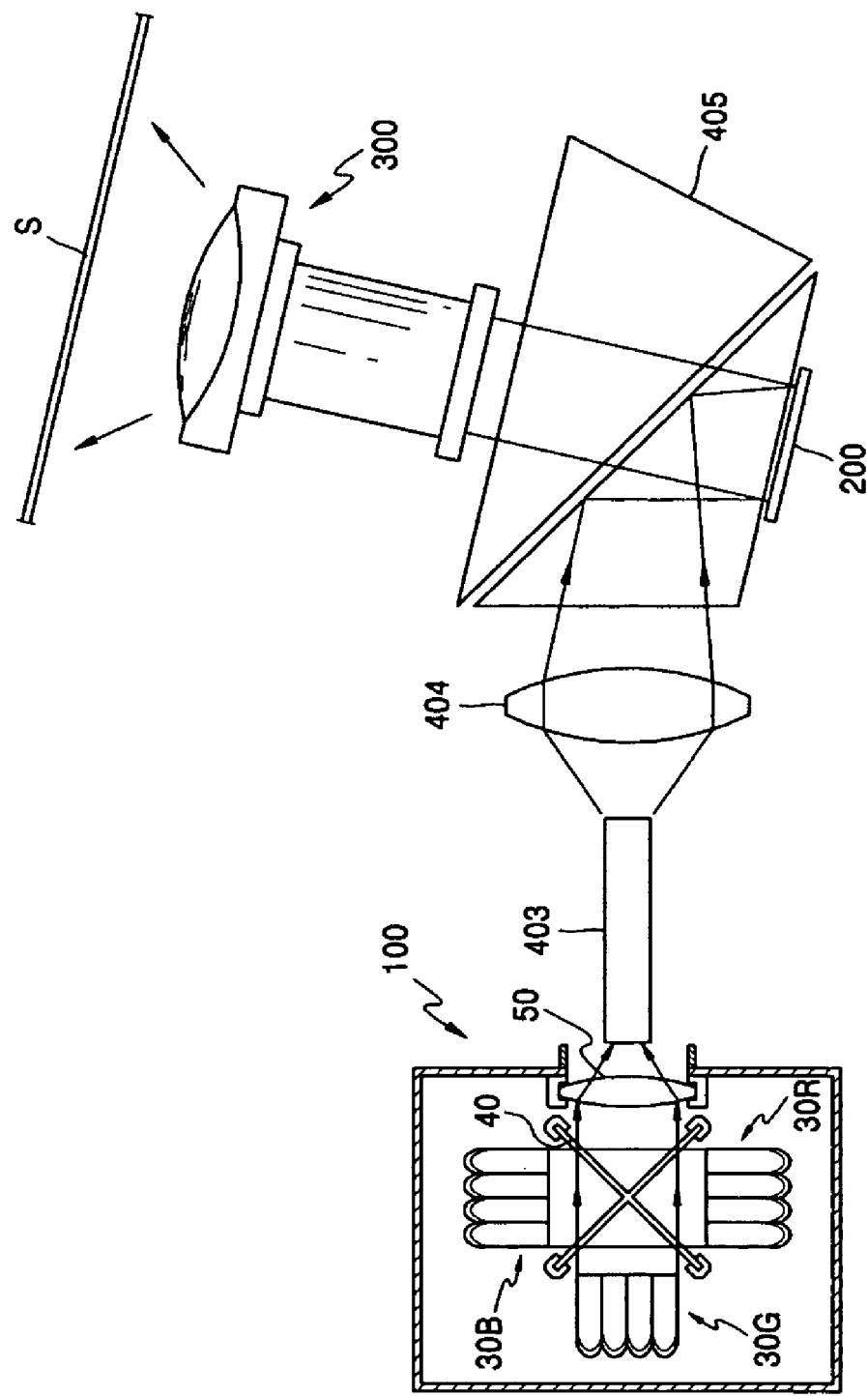
FIG. 9 is a view illustrating an image projecting apparatus according to an embodiment of the present general inventive concept.

The modularized illumination units 100 illustrated in FIGS. 2 through 8 can be employed as an illumination unit in an image projecting apparatus. FIG. 9 illustrates an image projecting apparatus according to an embodiment of the present general inventive concept. Referring to FIG. 9, the image projecting apparatus includes the illumination unit 100, an optical modulation element 200, and a projection lens unit 300. The illumination unit 100 sequentially emits red (R), green (G), and blue (B) lights. The illumination unit 100 can have the following configuration. The optical modulation element 200 sequentially modulates the red (R), green (G), and blue (B) lights sequentially emitted from the illumination unit 100 according to image data. The image data may include pixel information about images to be formed on the screen. The image projecting apparatus may be a single panel type image projecting apparatus using a single reflection type optical modulation element. A digital micromirror device (DMD), for example, can be used as the optical modulation element 200.

The red (R), green (G), and blue (B) lights sequentially emitted from the illumination unit 100 are incident on an integrator 403. The integrator 403 forms a surface light having a uniform light intensity. The integrator 403 may comprise a glass rod having a rectangular section or a light tunnel having an internal reflection surface. A relay lens unit 404 magnifies or contracts the light emitted from the integrator 403 to correspond to an aperture of the optical modulation element 200. The light from the integrator 403 then passes through a total internal reflection prism (TIR) 405 and is incident on the optical modulation element 200. The optical modulation element 200 sequentially modulates the red (R), green (G), and blue (B) lights according to the image data. The modulated lights are then guided toward the projection lens unit 300 by the TIR prism 405. The projection lens unit 300 magnifies the modulated lights and projects the same toward a screen S. Although not illustrated in the drawings, the illumination unit 100 according to the present general inventive concept can be employed in an image projecting apparatus using a transmission type optical modulation element such as an LCD panel.

As described above, according to the image projecting apparatus having the illumination unit according to various embodiments of the present general inventive concept, by employing an LED, a life span of the illumination unit is extended and the image projecting apparatus can be made compact. Additionally, since light emitted from the LED is collimated using a parabolic reflection surface (i.e., without using a lens), brightness of the image projecting apparatus can be improved. Furthermore, when an LED array is used as a light source in the illumination unit, collimating the light using the parabolic reflection surface is more effective than when using the lens. Since the LEDs used in the illumination unit are cooled using a common heat conducting plate, a change in an amount of light emitted by the LED according to a temperature change can be prevented such that brightness of the image projecting apparatus can be improved and maintained. Thus, a modularized illumination unit enables realization of a compact image projecting apparatus having a simplified structure.

The illumination unit according to the present general inventive concept and the image projecting apparatus employing the same have the following and/or other aspects.

First, since an LED is used as a light source, an illumination unit and an image projecting apparatus have a long life span and a compact size are realized.

Second, since the light emitted from the LED is collimated using a parabolic reflection surface, the light can be collimated at a high efficiency when using a single LED or when using an LED array.

Third, since a plurality of LEDs are cooled using a common heat conducting plate, a change in the amount of light emitted by the LED according to a change in temperature can be prevented such that the brightness of the illumination unit and the image projecting apparatus can be improved and maintained.

Fourth, since the illumination unit is modularized, a compact image projecting apparatus having a simplified structure can be realized.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination unit, comprising:
    a first heat conducting plate; and
    a plurality of light source modules emitting a plurality of lights having different colors, each light source module having at least one LED commonly mounted on the first heat conducting plate and at least one corresponding collimator to collimate light emitted from the at least one LED,
    wherein the collimator has a reflection surface shaped to reflect the light emitted from the at least one LED in substantially one direction; and
    wherein each of the light source modules comprises:
        a plurality of collimator groups in which one or more collimators are linearly arranged, and
        a plurality of LED groups in which one or more LEDs are linearly arranged, the LED groups are arranged in a stepwise manner with respect to one another, and a plurality of mounting portions are arranged in a stepwise manner on the first heat conducting plate to correspond with the LED groups such that the LEDs of the corresponding LED groups are mounted thereon.

2. The illumination unit as claimed in claim 1, wherein the at least one collimator comprises:
    a light incident surface through which to receive light from the at least one corresponding LED,
    a parabolic reflection surface facing the light incident surface to reflect the received light in substantially one direction, and a light exit surface facing the parabolic reflection surface and the light incident surface, and the at least one corresponding LED is disposed at a focal point of the parabolic reflection surface.

3. The illumination unit as claimed in claim 1, further comprising:
a color synthesizing member to guide the plurality of lights emitted by the plurality of light source modules to propagate along a single optical path;
a condensing lens unit to condense the guided light output from the color synthesizing member; and
a housing to accommodate the plurality of light source modules, the color synthesizing member, and the condensing lens unit,
wherein the first heat conducting plate is part of the housing.

4. The illumination unit as claimed in claim 1, further comprising:
a second heat conducting plate,
wherein the plurality of LED groups comprises one or more first and second LED groups, the plurality of collimator groups comprises one or more first and second collimator groups corresponding to the first and second LED groups, respectively, and the LEDs of the one or more first LED groups are commonly mounted on the first heat conducting plate while the LEDs of the one or more second LED groups are commonly mounted on the second heat conducting plate.

5. The illumination unit as claimed in claim 4, wherein the respective LED groups of the one or more first LED groups and the one or more second LED groups are arranged in a stepwise manner with one another and first and second mounting portions are provided on the first and second heat conducting plates in a stepwise manner with respect to one another to correspond to the respective LED groups.

6. The illumination unit as claimed in claim 4, further comprising:
a color synthesizing member to guide the plurality of lights emitted from the plurality of light source modules to propagate along a single optical path;
a condensing lens unit to condense the guided light output from the color synthesizing member; and
a housing to accommodate the plurality of light source modules, the color synthesizing member, and the condensing lens unit,
wherein the first and second heat conducting plates are part of the housing.

7. An illumination unit, comprising:
a housing having at least one heat conducting plate; and
at least one light emitting module having at least one LED disposed on the at least one heat conducting plate such that heat generated by the at least one LED is dissipated through the at least one heat conducting plate, and at least one collimator corresponding to the at least one LED to receive light in a first direction and collimate the light in a second direction,
wherein the collimator has a reflection surface shaped to reflect the received light in substantially one direction,
wherein the at least one collimator comprises at least one parabolic collimator disposed on the at least one LED at a focus point to collimate light emitted by the at least one LED, and
wherein the at least one light emitting module comprises:
a first group of LEDs disposed at a first height from the at least one heat conducting plate,
a first group of corresponding parabolic collimators disposed on the first group of LEDs to collimate light emitted by the first group of LEDs in a first direction, and each of the parabolic collimators in the first group of parabolic collimators having a first length,
a second group of LEDs disposed at a second height from the at least one heat conducting plate and adjacent to the first group of LEDs, and
a second group of corresponding parabolic collimators disposed on the second group of LEDs to collimate light emitted by the second group of LEDs in the first direction, and each of the parabolic collimators in the second group of parabolic collimators having a second length.

8. The illumination unit as claimed in claim 7, wherein the at least one parabolic collimator has a conic coefficient between −0.4 and −2.5.

9. The illumination unit as claimed in claim 7, wherein the at least one light emitting module further comprises:
a first group of mounting portions having the first height in which the first group of LEDs is installed; and
a second group of mounting portions disposed adjacent to the first group of mounting portions and having the second height in which the second group of LEDs is installed.

10. An illumination unit, comprising:
a housing having at least one heat conducting plate; and
at least one light emitting module having at least one LED disposed on the at least one heat conducting plate such that heat generated by the at least one LED is dissipated through the at least one heat conducting plate, and at least one collimator corresponding to the at least one LED to receive light in a first direction and collimate the light in a second direction,
wherein:
the collimator has a reflection surface shaped to reflect the received light in substantially one direction,
the housing comprises a first heat conducting unit as an upper plate thereof and a second heat conducting unit as a lower plate thereof, and
the at least one light emitting module comprises at least one first LED disposed on the first heat conducting unit at a predetermined position thereof and at least one second LED disposed on the second heat conducting unit at the predetermined position thereof.

11. An image projecting apparatus, comprising:
an illumination unit to sequentially emit a plurality of lights having different colors, the illumination unit comprising:
a first heat conducting plate, and
a plurality of light source modules to emit the plurality of lights having the different colors, each light source module having at least one LED mounted on the first heat conducting plate and at least one corresponding collimator to collimate the light emitted by the at least one LED,
wherein the collimator has a reflection surface shaped to reflect the light emitted by the at least one LED in substantially one, and
wherein the at least one LED comprises one or more LEDs, each of the plurality of light source modules comprises a plurality of collimator groups in which one or more collimators are linearly arranged and a plurality of corresponding LED groups in which one or more LEDs are linearly arranged, the LED groups arranged in a stepwise manner with respect to one another, and the illumination unit further comprises a plurality of mounting portions provided on the first heat conducting plate arranged in a stepwise manner to correspond with the LED groups such that the LEDs of the corresponding LED groups are mounted thereon;

an optical modulation element to sequentially modulate the plurality of lights received from the illumination unit according to image information; and a projection lens unit to project the modulated light to a screen.

12. The image projecting apparatus as claimed in claim 11, wherein the at least one collimator comprises:

a light incident surface through which to receive light from the at least one corresponding LED, a parabolic reflection surface facing the light incident surface to reflect the received light in substantially one direction, and a light exit surface facing the parabolic reflection surface and the light incident surface.

13. The image projecting apparatus as claimed in claim 11, wherein the illumination unit further comprises:

a color synthesizing member to guide the plurality of lights emitted by the plurality of light source modules to propagate along a single optical path;

a condensing lens unit to condense the guided light output from the color synthesizing member; and a housing to accommodate the plurality of light source modules, the color synthesizing member, and the condensing lens unit, wherein the first heat conducting plate is part of the housing.

14. The image projecting apparatus as claimed in claim 11, wherein the illumination unit further comprises a second heat conducting plate, the plurality of LED groups comprises one or more first and second LED groups, the plurality of collimator groups comprises one or more first and second collimator groups corresponding to the first and second LED groups, respectively, and the LEDs of a first one or more LED groups are commonly mounted on the first heat conducting plate while the LEDs of a second one or more LED groups are commonly mounted on the second heat conducting plate.

15. The image projecting apparatus as claimed in claim 14, wherein the respective LED groups of the first one or more LED groups and the second one or more LED groups are arranged in a stepwise manner with respect to one another, and the illumination unit further comprises first and second mounting portions provided on the first and second heat conducting plates, respectively, in a stepwise manner with respect to one another to correspond with the respective first one or more LED groups and second one or more LED groups.

16. The image projecting apparatus as claimed in claim 14, wherein the illumination unit further comprises:

a color synthesizing member to guide the plurality of lights emitted from the plurality of light source modules to propagate along a single optical path;

a condensing lens unit to condense the guided light output from the color synthesizing member; and a housing to accommodate the plurality of light source modules, the color synthesizing member, and the condensing lens unit, and the first and second heat conducting plates are part of the housing.

* * * * *